United States Patent
Cougar

(10) Patent No.: US 11,100,785 B1
(45) Date of Patent: Aug. 24, 2021

(54) METHOD FOR REQUESTING ASSISTANCE FROM EMERGENCY SERVICES

(71) Applicant: Alex Cougar, Detroit, MI (US)

(72) Inventor: Alex Cougar, Detroit, MI (US)

( * ) Notice: Subject to any disclaimer, the term of this patent is extended or adjusted under 35 U.S.C. 154(b) by 0 days.

(21) Appl. No.: 17/150,990

(22) Filed: Jan. 15, 2021

(51) Int. Cl.
  G08B 1/08 (2006.01)
  G08B 25/00 (2006.01)
  H04W 4/90 (2018.01)

(52) U.S. Cl.
  CPC ............ *G08B 25/006* (2013.01); *H04W 4/90* (2018.02)

(58) Field of Classification Search
  CPC ................................ G08B 25/006; H04W 4/90
  See application file for complete search history.

(56) References Cited

U.S. PATENT DOCUMENTS

| | | | |
|---|---|---|---|
| 6,642,844 B2 * | 11/2003 | Montague | B60R 25/102 340/524 |
| 6,847,295 B1 | 1/2005 | Taliaferro et al. | |
| 8,747,336 B2 | 6/2014 | Tran | |
| 9,615,546 B2 | 4/2017 | Pantazes | |
| 2010/0231378 A1 | 9/2010 | Ward | |
| 2011/0071880 A1 * | 3/2011 | Spector | H04W 4/90 340/573.1 |
| 2012/0092157 A1 * | 4/2012 | Tran | A61B 5/0008 340/539.12 |
| 2017/0098118 A1 | 4/2017 | Apelbaum et al. | |
| 2017/0300629 A1 * | 10/2017 | Ross | G16H 10/60 |
| 2018/0176362 A1 * | 6/2018 | Cohen | H04W 4/029 |
| 2019/0307106 A1 * | 10/2019 | Hartung | A01K 29/00 |
| 2020/0196105 A1 * | 6/2020 | Hunter | H04W 4/38 |
| 2021/0044673 A1 * | 2/2021 | MacGabann | H04L 67/28 |

* cited by examiner

*Primary Examiner* — Phung Nguyen

(57) ABSTRACT

A method of requesting assistance from emergency services employs an electronic actuator that is preconfigured to communicate with authorities in the event that the actuator is used. An electronic signal is relayed from the device to remote servers, where machine learning and artificial intelligence logic is applied to the signal, before relaying a signal to the most appropriate authorities. The electronic signal may include information such as identifying and location information. The signal may also utilize various sensors or detectors, such as cameras, accelerometers, light sensors, pressure sensors, and more in order to collect and relay additional data. The response is then relayed to the authorities, who may continue to receive information about the user while in transit. In this way, the method of requesting assistance from emergency services provides security for people who may encounter emergency situations in which they cannot use a phone or mobile device.

11 Claims, 12 Drawing Sheets

US 11,100,785 B1

METHOD FOR REQUESTING ASSISTANCE FROM EMERGENCY SERVICES

FIELD OF THE INVENTION

The present invention generally relates to emergency services. More specifically, the method of requesting assistance from emergency services is implemented by a system for contacting appropriate authorities in the event of an emergency, including public danger, medical emergencies, and more.

BACKGROUND OF THE INVENTION

A variety of public institutions together contribute to a general feeling of safety and security among the public. The availability of emergency health services, police, firefighters, and other such services is a feature of developed communities that allows people to go about their daily lives with minimal cause for concern over extreme possible situations. These resources can be summoned at any time by calling the appropriate emergency response number on a telephone. Once dialed, operators determine the appropriate emergency response personnel to send, as well as appropriate equipment, necessary information, and the like.

Unfortunately, there are many situations in which dialing a number is made difficult or impossible. In many medical emergencies, it may be out of a user's ability to locate and navigate through a phone or similar device. Such medical scenarios could include strokes, heart attacks, seizures, cardiac arrest, or more. Alternatively, in dangerous criminal situations, it may be inadvisable to reach for or use a phone. In a hostage situation or a home robbery, usage of a phone could put the user at increased risk of injury. What is needed is a method for contacting emergency authorities that mitigates risk associated with requiring the dexterous or covert usage of a wireless device. Further desirable is a device that is accessible and can accept inputs from surrounding areas in order to determine appropriate responses.

The present invention addresses these issues. The method of requesting assistance from emergency services employs an electronic actuator that is preconfigured to communicate with authorities in the event that the actuator is used. The electronic actuator may be depressed covertly if that is necessary according to the requirements of the emergency event. A signal is relayed from the device to remote servers, where machine learning and artificial intelligence logic is employed before relaying a signal to the most appropriate authorities. The signal may include information such as identifying and location information. The signal may also utilize various sensors or detectors, such as cameras, accelerometers, light sensors, pressure sensors, and more in order to collect and relay additional data. In this way, the present invention provides security for people who may encounter emergency situations in which they cannot use a phone or mobile device. The present invention may further connect to family members or other personal emergency contacts as deemed appropriate by the user and a given emergency in order to share relevant information or establish a line of communication.

DETAILED DESCRIPTION OF THE INVENTION

All illustrations of the drawings are for the purpose of describing selected versions of the present invention and are not intended to limit the scope of the present invention.

Figure 1:
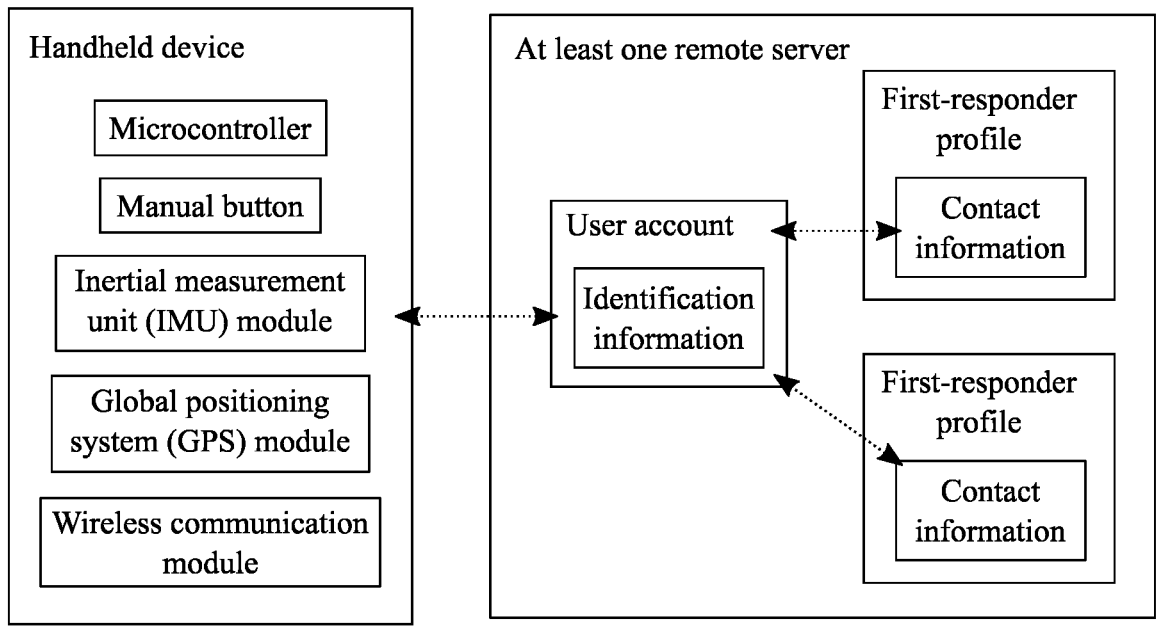
FIG. 1 is a block diagram illustrating the system of the present invention.
Figure 2:
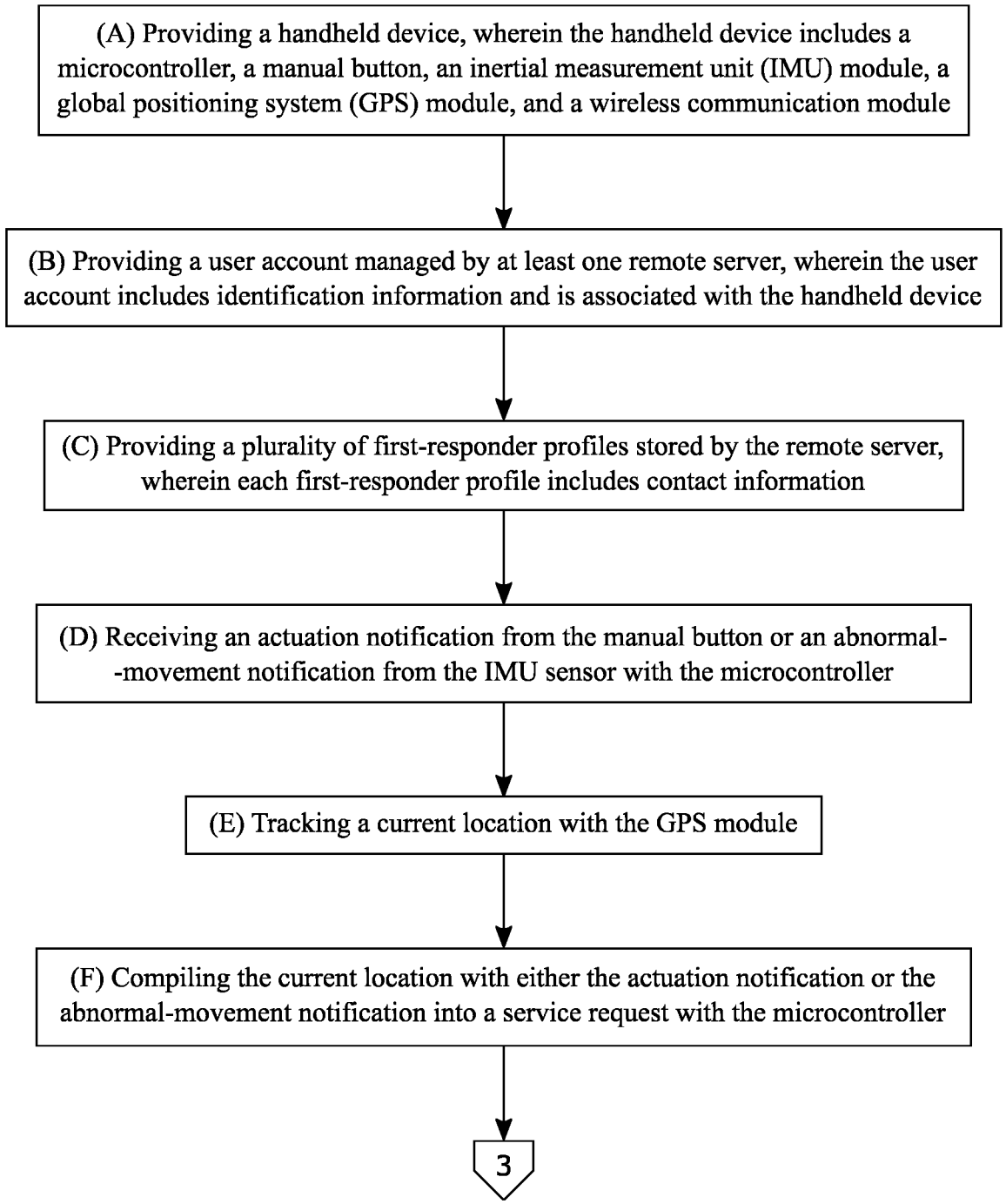
FIG. 2 is a flowchart illustrating the overall process for the method of the present invention.

As represented in FIG. 1, the present invention is a system and method of requesting assistance from emergency services that allows a user to communicate more effectively with emergency responders. The present invention accomplishes this by providing an intuitive device which can send relevant information to appropriate authorities. The present invention provides a handheld device, wherein the handheld device includes a microcontroller, a manual button, an inertial measurement unit (IMU) module, a global positioning system (GPS) module, and a wireless communication module (Step A), as represented in FIG. 2. The handheld device is preferably a rigid unit of shape and material such that the handheld device can be placed or hidden in a variety of locations upon the user. The microcontroller relates to a processor capable of accepting electronic inputs, applying preprogrammed logic to the input data, and sending appropriate electronic outputs. The manual button is an actuator capable of accepting manual input from the user and converting that input into an electronic signal. An IMU module may be any type of accelerometer or other device capable of determining the relative position of the handheld device at a given time and comparing that position to previously measured positions, thus allowing the IMU module to determine movement velocity and acceleration. The GPS module is a location tracking device capable of calculating the coordinates of the handheld device. The wireless communication module relates to a set of electronic devices capable of connecting wirelessly to the Internet.

Use of these provided components enables a user to connect at will to appropriate emergency responders. A user account managed by at least one remote server is also provided, wherein the user account includes identification information and is associated with the handheld device (Step B). The identification information may include any or all of name, birthdate, health conditions, address, contact information such as phone numbers and email addresses, height, weight, eye color, hair color, and more. In this way, the handheld device may relay important information along with information about the emergency event. Furthermore, a plurality of first-responder profiles stored by the remote server is provided, wherein each first-responder profile includes contact information (Step C). The first responder profile relates to a set of information about a given first responder, which may include a variety of personal information, including any or all of name, birthdate, address, height, weight, eye color, hair color, and more, as well as relevant work experience. The contact information may include phone numbers, email addresses, or other tools and information that may be used to establish a line of communication with a user during an emergency.

Figure 3:
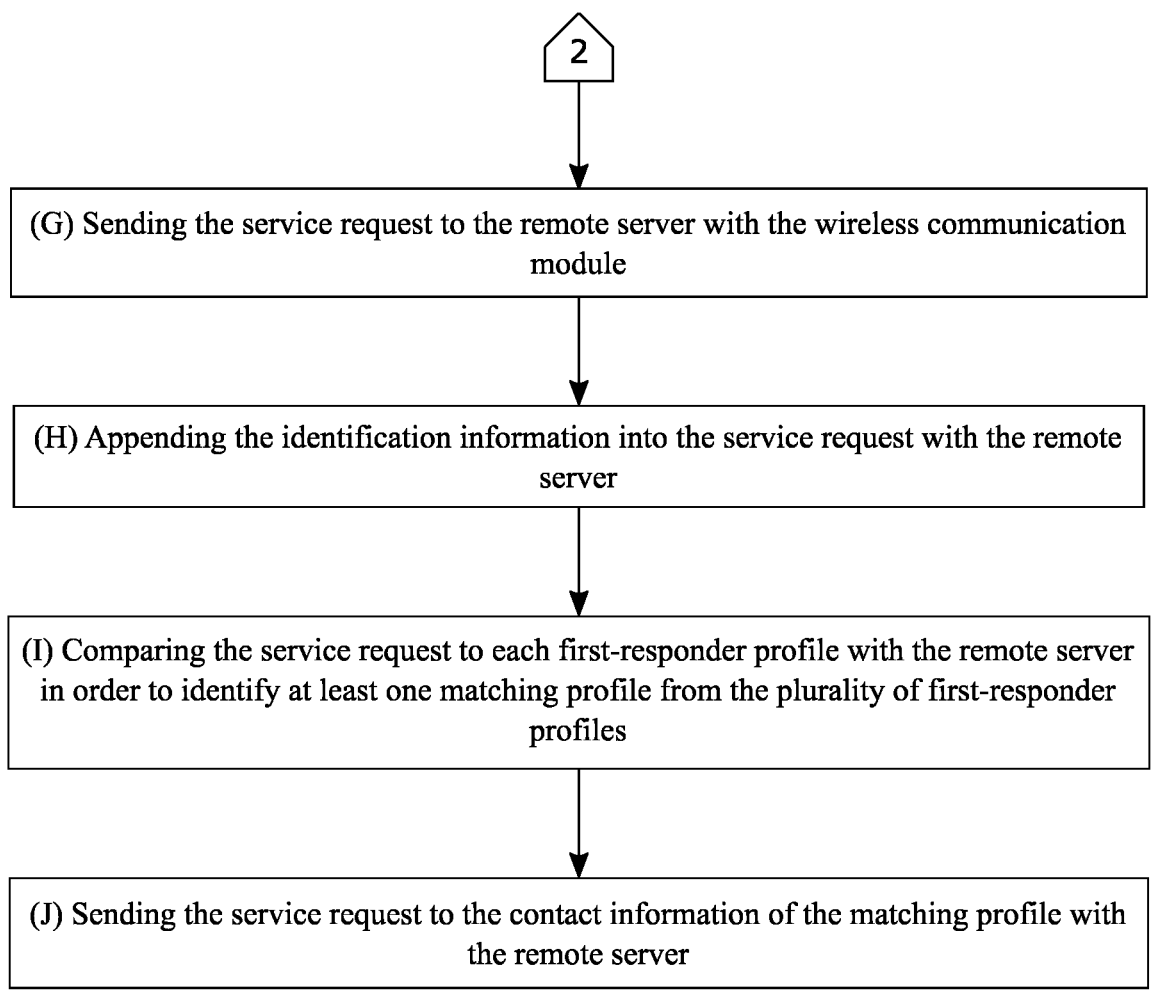
FIG. 3 is a continuation of FIG. 2.

The overall process followed by the method of the present invention allows a user to effectively and efficiently communicate with emergency responders. An actuation notification is received from the manual button or an abnormal-movement notification from the IMU sensor with the microcontroller (Step D). The actuation notification begins the connection process with the relevant emergency responders. An abnormal-movement notification relates to receipt of an abnormal amount of movement from the handheld device, as would occur when a user falls or receives an impact. In an exemplary embodiment, in the event of a false positive signal from the IMU sensor, the signal may be ended through actuation of the manual button. The present invention must provide a method for sending information wirelessly through the at least one remote server and to the plurality of first responder profiles. A current location is tracked with the GPS module (Step E). The current location relates to the geographic location of the user. This arrangement enables the handheld device to provide information regarding the location of a user. The current location is next compiled with either the actuation notification or the abnormal-movement notification into a service request with the microcontroller (Step F). The service request includes data relating to the user's circumstances, as made available through the GPS module, IMU module, and a variety of other sensors. The service request is then sent to the remote server with the wireless communication module (Step G), as represented in FIG. 3. In this way, the relevant information about the emergency event is transmitted for storage and processing. The identification information is appended into the service request with the remote server (Step H). This arrangement ensures that all information regarding both the event and the user is compiled into one object. The service request is compared to each first-responder profile with the remote server in order to identify at least one matching profile from the plurality of first-responder profiles (Step I). Thus, the appropriate responder or responders are determined by the remote server. Finally, the service request is sent to the contact information of the matching profile with the remote server (Step J). In this way, the matching profile is provided with all information necessary to respond to an emergency event for a user.

Figure 4:
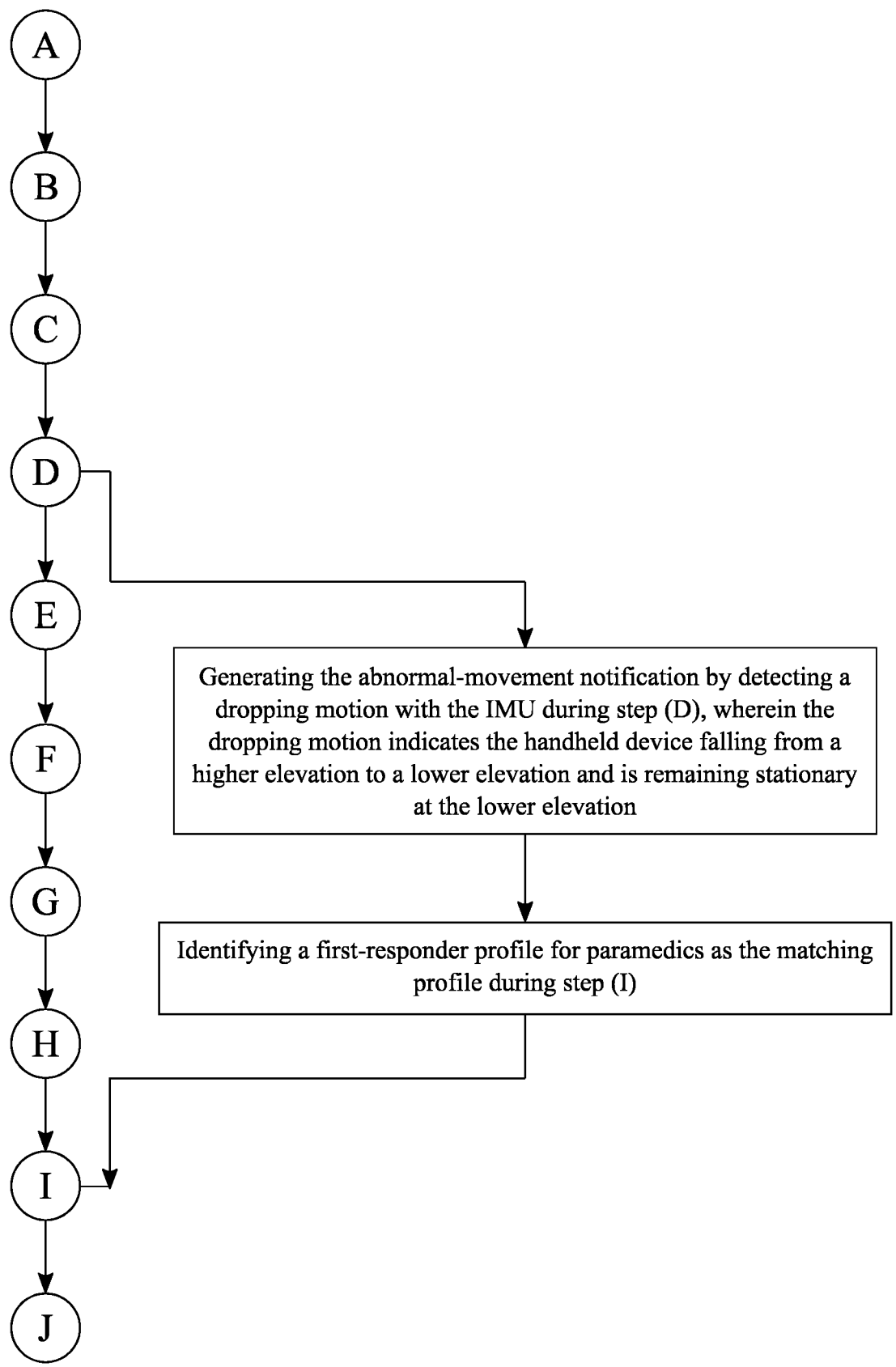
FIG. 4 is a flowchart illustrating a subprocess of identifying a medical emergency.

It is possible that the user of the present invention is rendered unable to generate a notification, particularly after the user suffers a fall. To this end, the abnormal-movement notification may be generated by detecting a dropping motion with the IMU during Step D, wherein the dropping motion indicates the handheld device falling from a higher elevation to a lower elevation and remaining stationary at the lower elevation, as represented in FIG. 4. The IMU module may provide the necessary position-monitoring capabilities required to determine movement of the handheld device. A first-responder profile for paramedics is then identified as the matching profile during Step I. Thus, the present invention may notify appropriate authorities based upon receipt of a signal involving abnormal dropping motion.

Figure 5:
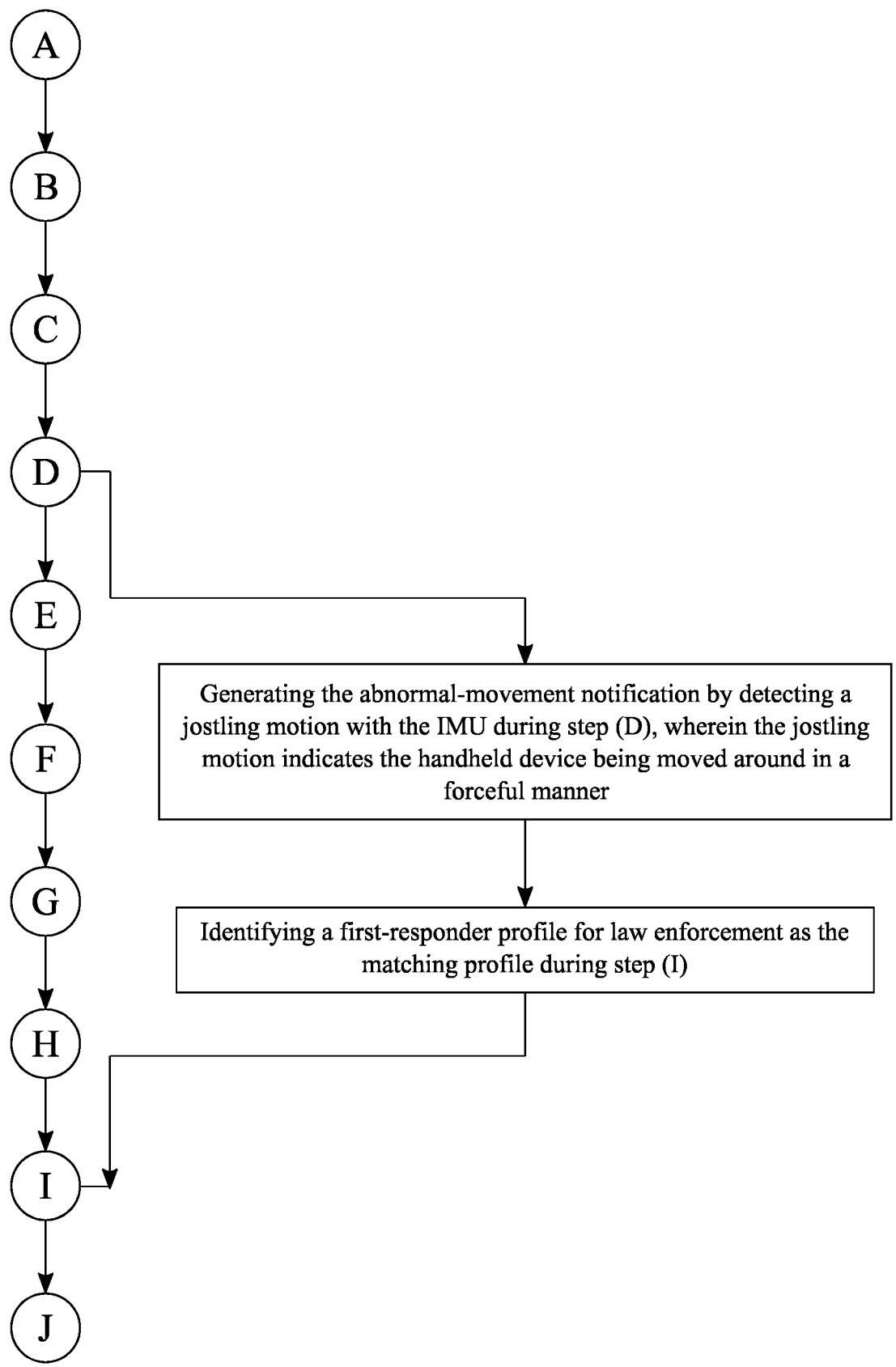
FIG. 5 is a flowchart illustrating a subprocess of identifying a hostile emergency.

In another potential emergency scenario, a user may be jostled or shaken by an aggressor, or in the process of avoiding an aggressor. To address this scenario, the abnormal-movement notification may be generated by detecting a jostling motion with the IMU during Step D, wherein the jostling motion indicates the handheld device being moved around in a forceful manner, as represented in FIG. 5. The IMU provides the necessary capability for detecting the abnormal motion of being shaken, shoved, or otherwise affected by an aggressive party. A first-responder profile for law enforcement is then identified as the matching profile during Step I. Thus, the police and relevant authorities can arrive in a timely manner where they are needed.

Figure 6:
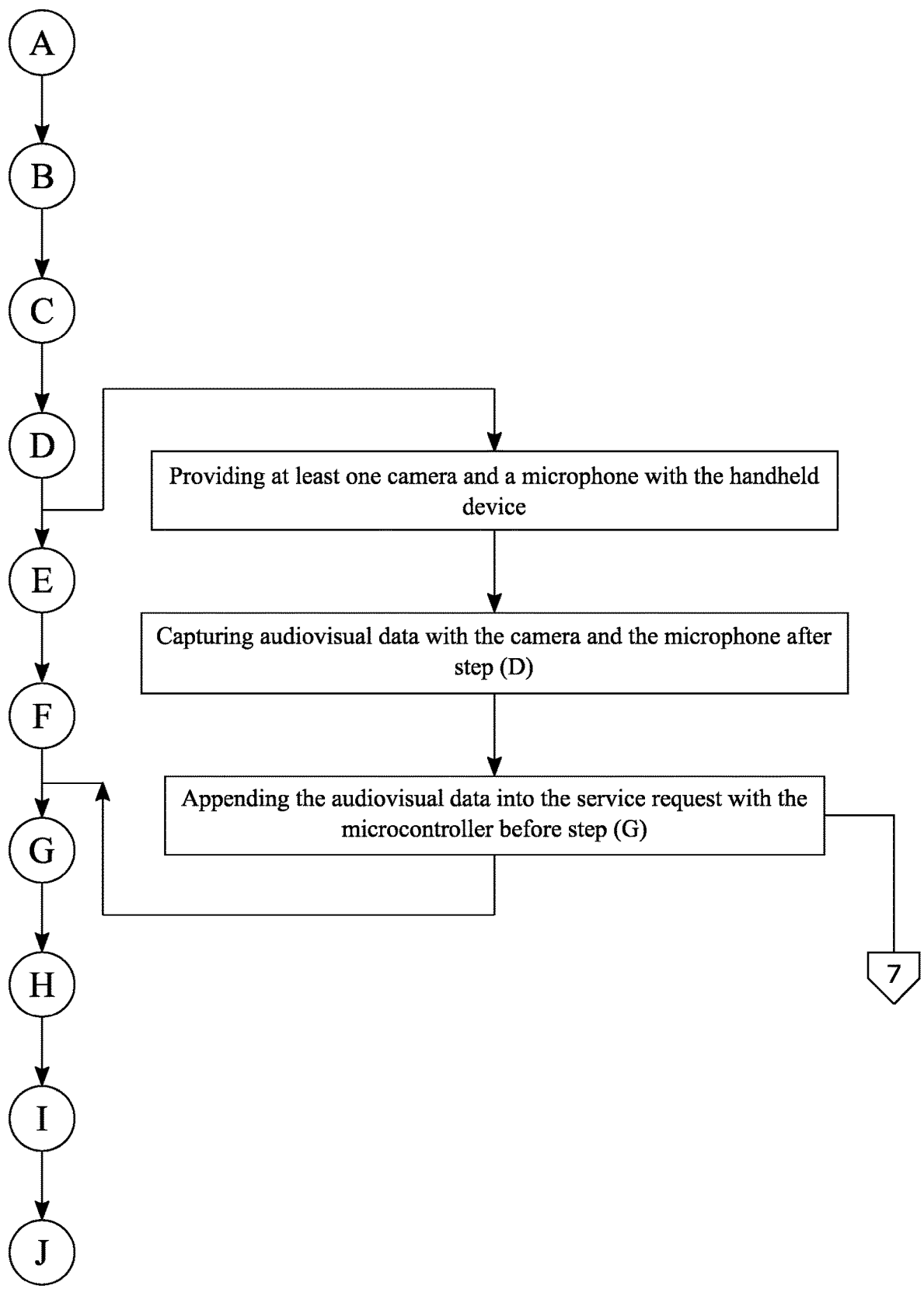
FIG. 6 is a flowchart illustrating a subprocess of collecting audiovisual data.

Many situations evolve in which additional information about the situation may be important for emergency responders. To provide this information, at least one camera and a microphone may be provided with the handheld device, as represented in FIG. 6. The at least one camera relates to a device capable of capturing image and video data. The microphone relates to an audio sensor capable of converting sound waves into electronic signals. Next, audio-visual data may be captured with the camera and the microphone after Step D. This arrangement enables collection of information about a given incident. The audiovisual data is then appended into the service request with the microcontroller before Step G. Thus, the ultimately selected first-responder profile is provided with additional information about a given incident which may help in approaching, diagnosing, and responding to various emergency situations.

Figure 7:
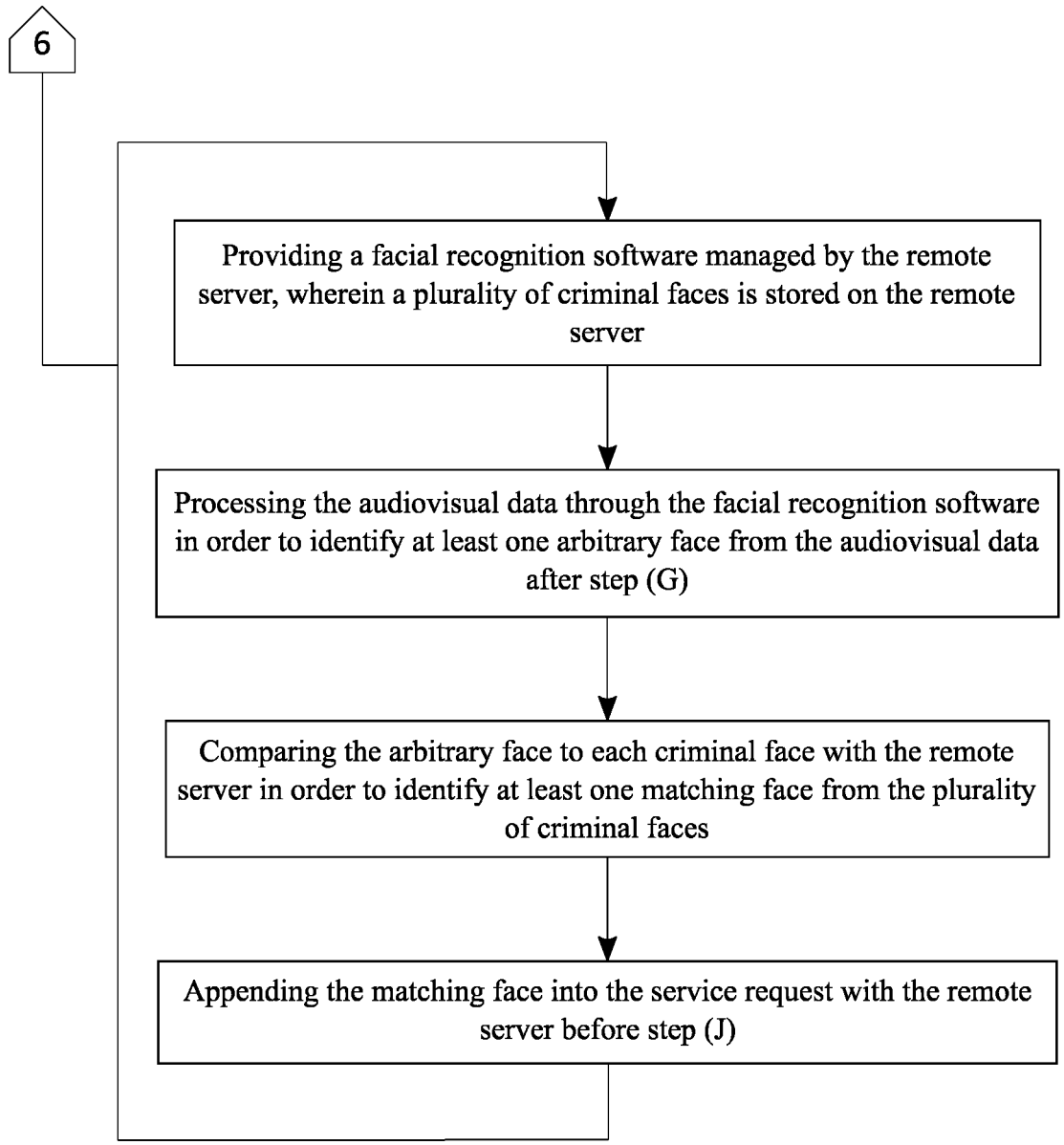
FIG. 7 is a flowchart illustrating a subprocess of identifying likely hostile suspects through facial recognition software.

In many cases, it is useful to be aware of the identities of people around the handheld device. To enable the present invention to identify proximal parties, a facial recognition software managed by the remote server may be provided, wherein a plurality of criminal faces is stored on the remote server, as represented in FIG. 7. The facial recognition software relates to a software program that distinguishes unique facial features in order to identify a subject. The plurality of criminal faces relates to a set of images stored in the remote server against which a captured image may be compared. The audiovisual data is next processed through the facial recognition software in order to identify at least one arbitrary face from the audiovisual data after Step G. In this way, captured images of various faces surrounding the user during an incident are captured and compared to identify potential perpetrators. The arbitrary face is then compared to each criminal face with the remote server in order to identify at least one matching face from the plurality of criminal faces. Thus, likely suspects can be identified prior to an officer or other emergency responder arriving on the scene. The matching face is then appended into the service request with the remote server before Step J. In this way, emergency responders can be better prepared for an encounter with a hostile or otherwise suspicious person.

In some situations, a regular camera may not be able to adequately capture an image due to poor lighting conditions. To this end, the at least one camera may include a normal camera and an infrared camera, wherein the normal camera is configured for daytime use, and wherein the infrared camera is for nighttime use. The normal camera captures images optimally in standard lighting, which makes the normal camera ideal for daytime use. The infrared camera is more light-sensitive and can therefore capture images that are of higher quality at night and in poor lighting conditions than the normal camera can.

Figure 8:
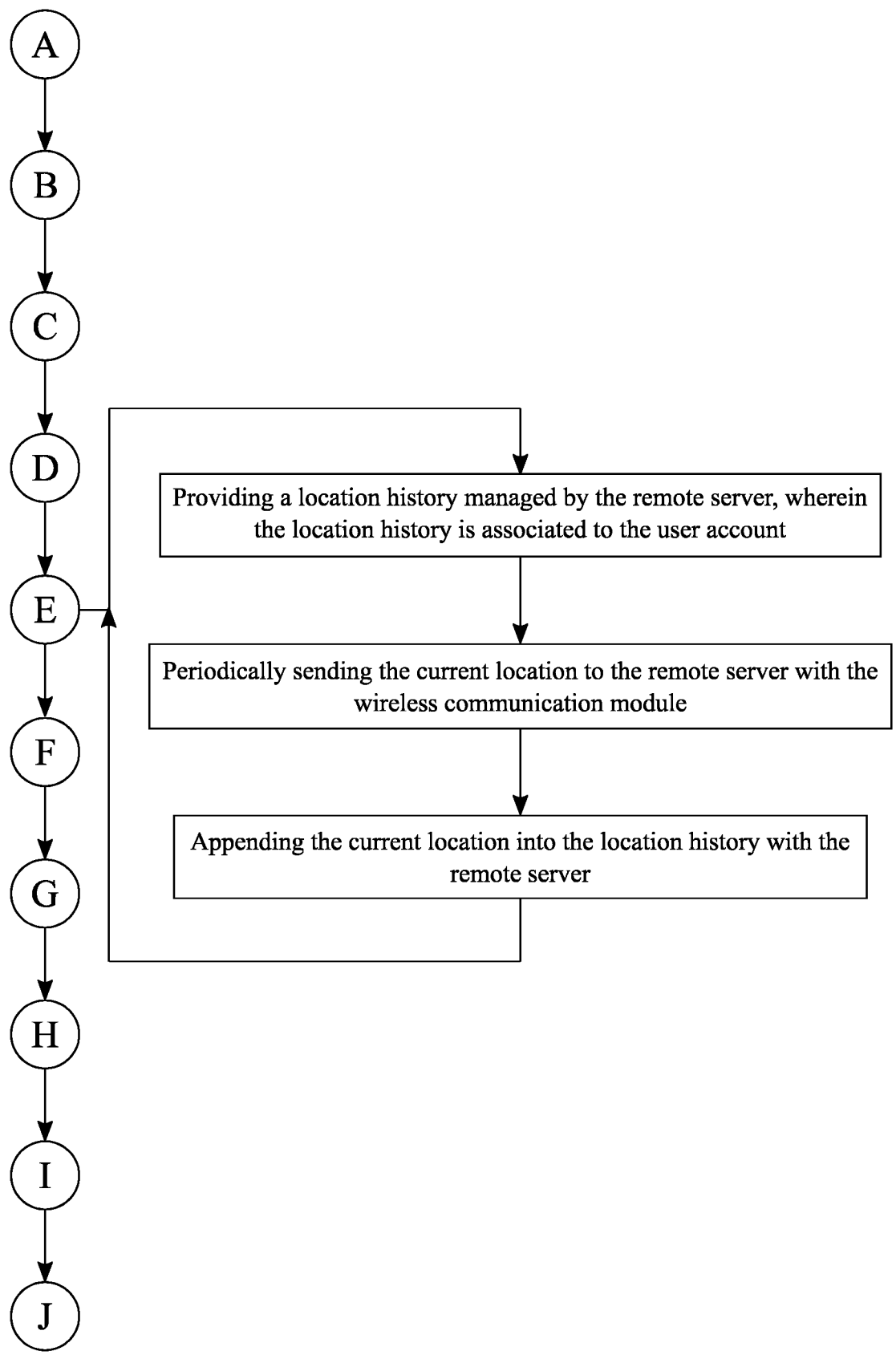
FIG. 8 is a flowchart illustrating a subprocess of location tracking.

A potentially dangerous situation is that the user of the present invention may go missing, whether that occurs through simply becoming lost or due to a kidnapping. In order to provide useful information about the user's whereabouts, a location history managed by the remote server may be provided, wherein the location history is associated to the user account, as represented in FIG. 8. The location history relates to a documented set of coordinates or other such location-identifying information. The current location is periodically sent to the remote server with the wireless communication module. The time interval between documentation of the current location may be adjustable by the user or may be set to a default value. Finally, the current location is appended into the location history with the remote server. In this way, the remote server may provide emergency services with useful information regarding the user's location and movement patterns.

Figure 9:
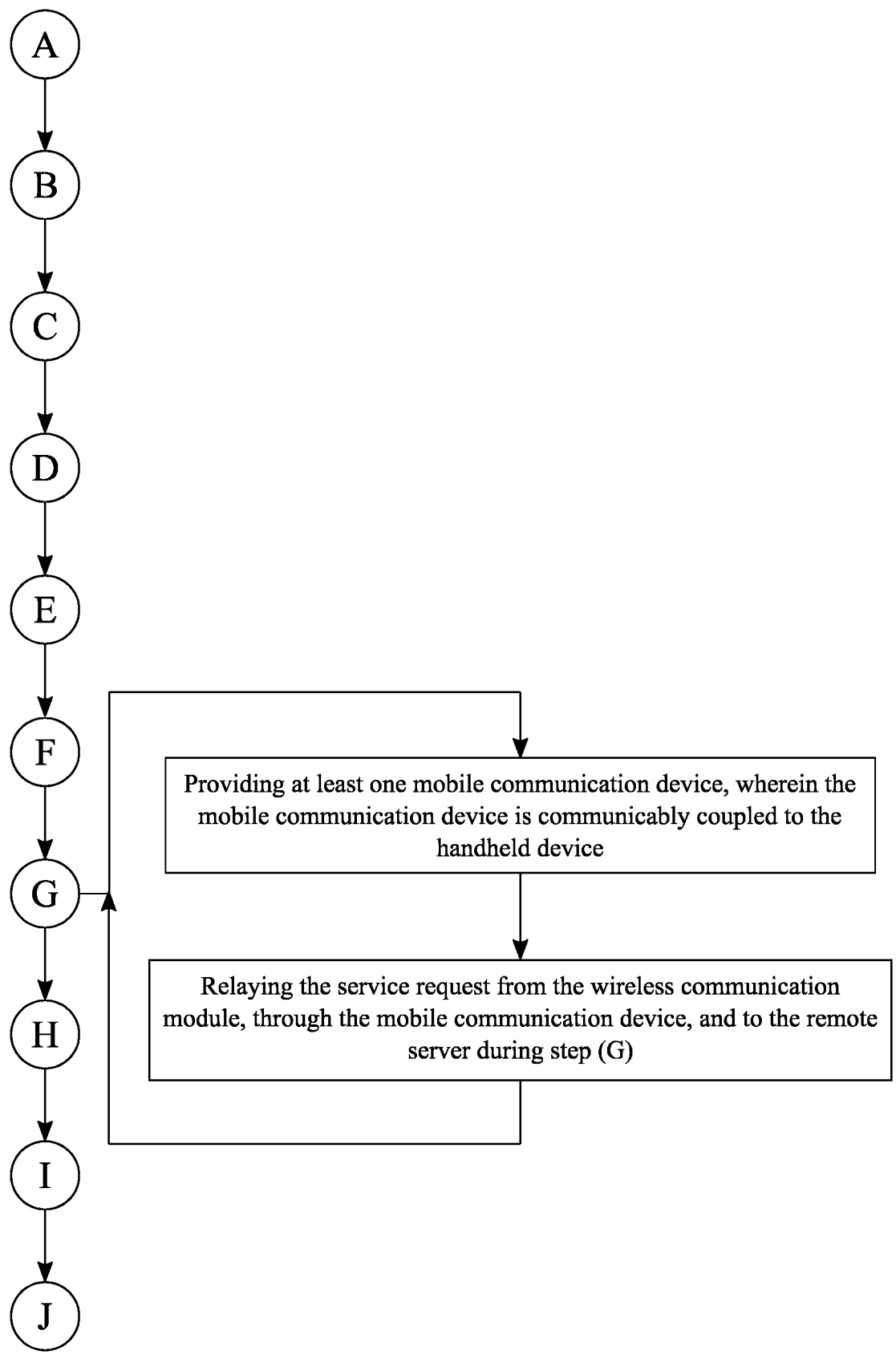
FIG. 9 is a flowchart illustrating a subprocess of integrating smart device technologies.

The user may benefit from the ability to interact more explicitly with authorities through the handheld device. To enable this, at least one mobile communication device may be provided, wherein the mobile communication device is communicably coupled to the handheld device, as represented in FIG. 9. The at least one mobile device may relate to any of smartphones, smart devices, cell phones, personal computers, or more capable of connecting wirelessly to the Internet. The service request is then relayed from the wireless communication module, through the mobile communication device, and to the remote server during Step G. Thus, the user may provide further information to emergency services through the remote server.

Figure 10:
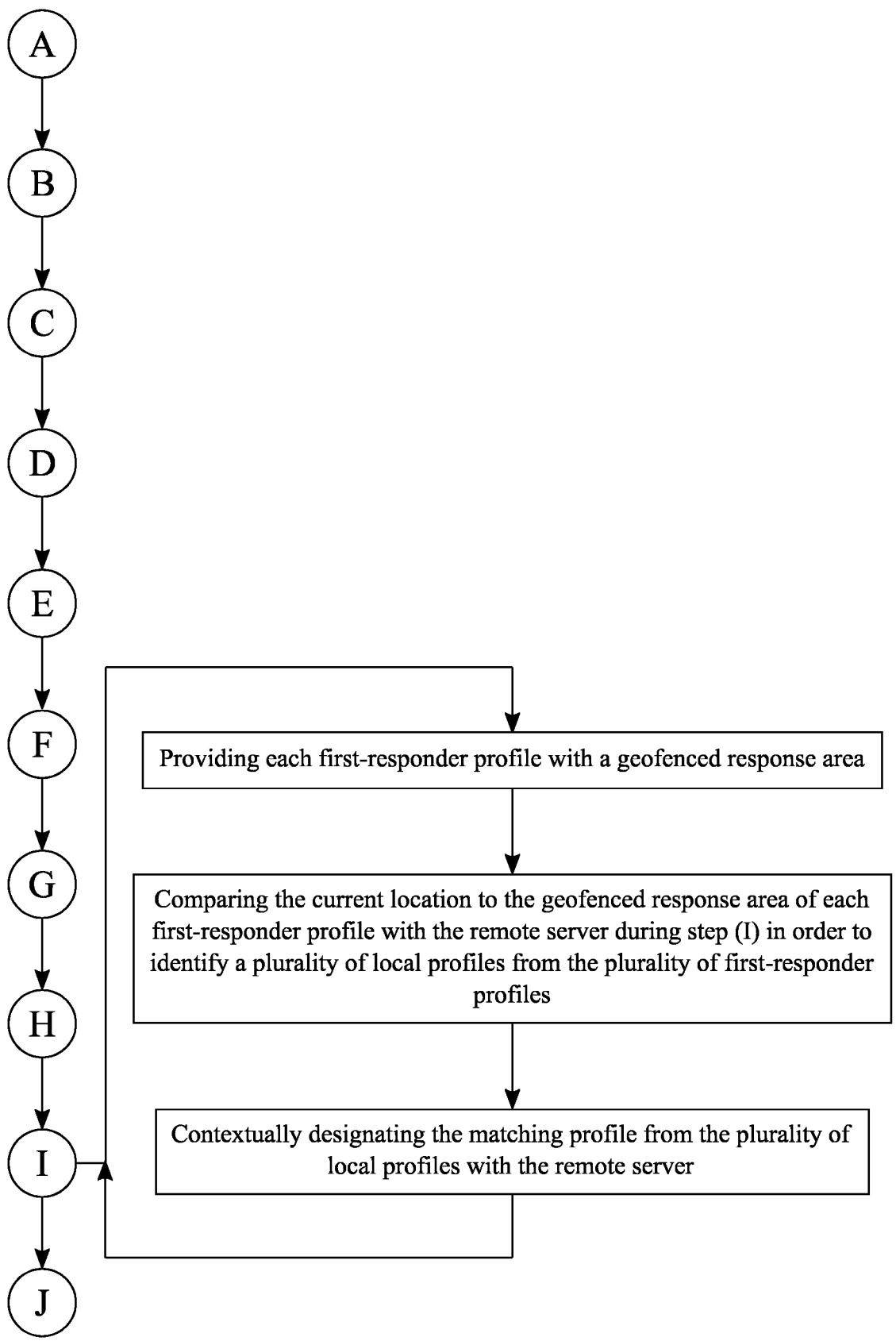
FIG. 10 is a flowchart illustrating a subprocess of optimizing selection of first-responders.

In many emergency situations, time is of the essence. It is therefore essential to minimize the amount of time that can elapse between receipt of a service request and subsequent arrival of an emergency responder. To achieve this, each first-responder profile may be provided with a geofenced response area, as represented in FIG. 10. The geofenced response area relates to the boundary coordinates that define the area within which an emergency responder can be available within a short amount of time. Next, the current location is compared to the geofenced response area of each first-responder profile with the remote server during Step I in order to identify a plurality of local profiles from the plurality of first-responder profiles. This arrangement ensures that the most proximal first-responder profiles are notified about nearby emergencies. The matching profile is then contextually designated from the plurality of local profiles with the remote server. In this way, the most optimal first responders are selected based on proximity and the nature of a given emergency situation.

Figure 11:
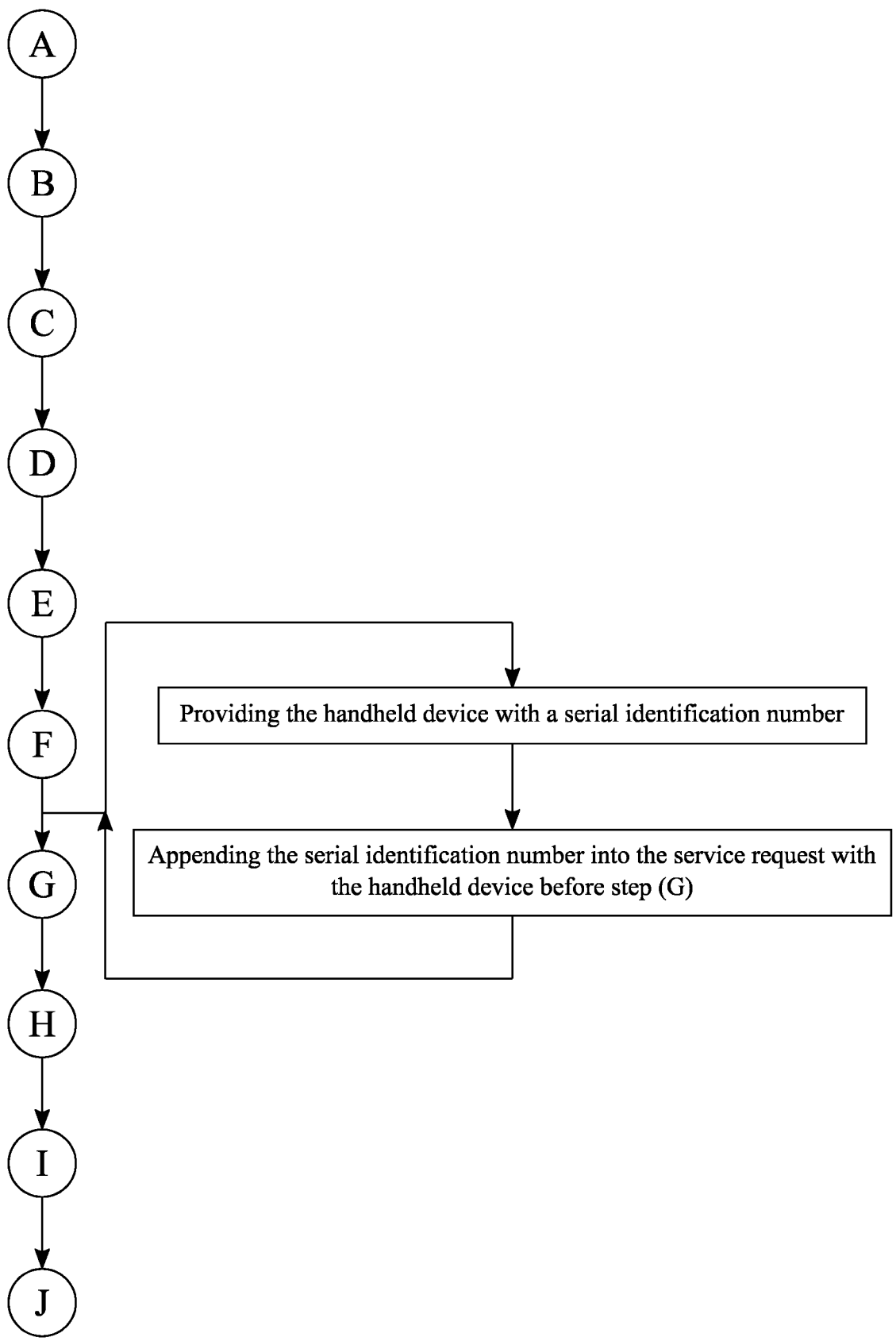
FIG. 11 is a flowchart illustrating a subprocess of identifying a device.

A user may have the handheld device removed, stolen, or otherwise lost in the course of an emergency event. To facilitate identification of ownership of the handheld device, the handheld device may be provided with a serial identification number, as represented in FIG. 11. The serial identification number is an identifying code that is unique to each handheld device. The serial identification number is then appended into the service request with the handheld device before Step G. Thus, the remote server contains the information necessary to identify a handheld device, thereby enabling the handheld device to be returned appropriately.

Figure 12:
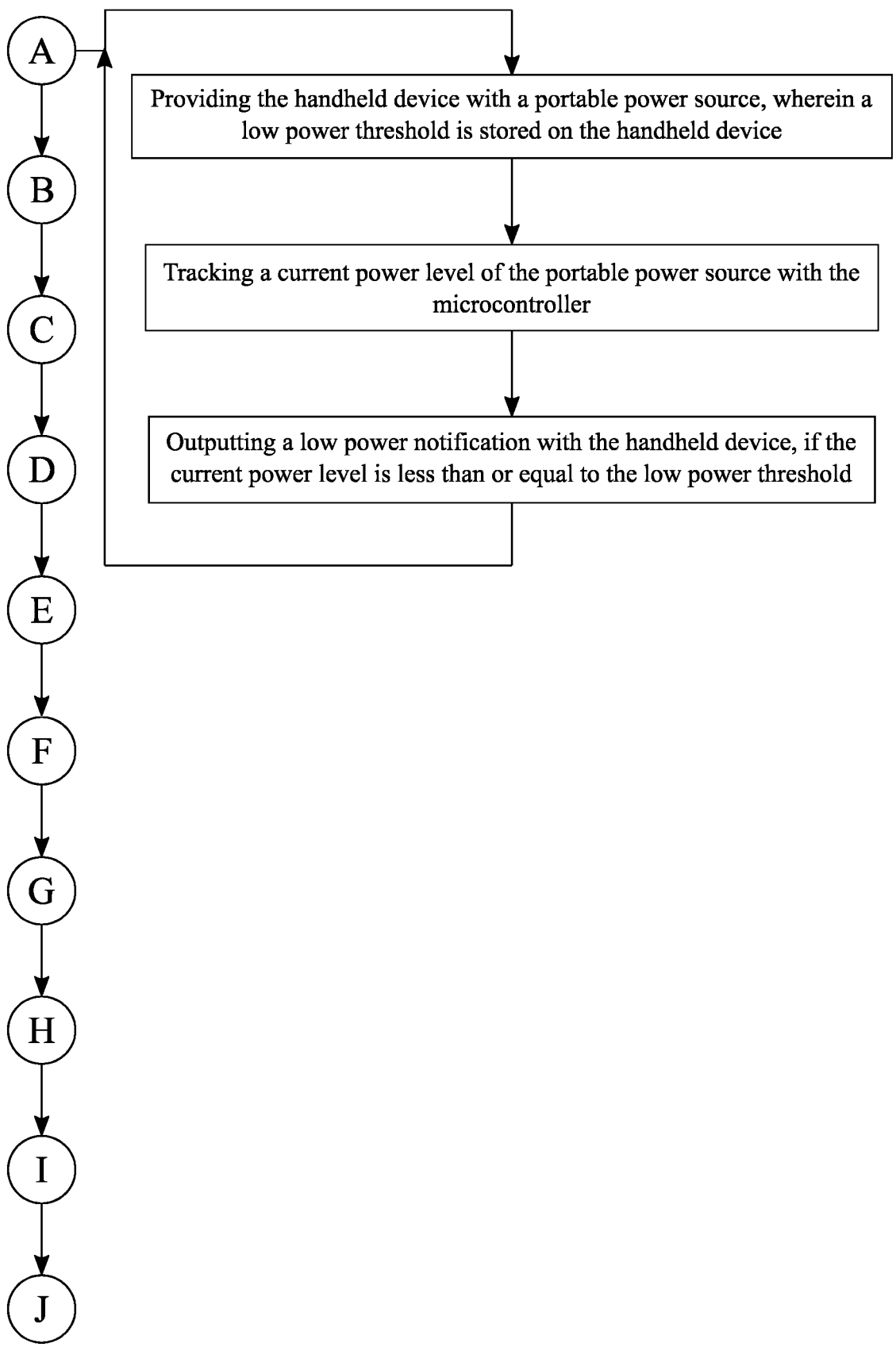
FIG. 12 is a flowchart illustrating a subprocess of providing power level feedback.

The handheld invention requires electronic power to continuously function during everyday use and emergency use. To allow for this, the handheld device may be provided with a portable power source, wherein a low power threshold is stored on the handheld device, as represented in FIG. 12. The portable power source may relate to any of a variety of batteries, including both rechargeable batteries and disposable batteries, and may further denote an electrical cord that allows a user to plug the handheld device into a wall or other device to change. A current power level of the portable power source is tracked with the microcontroller. This arrangement allows the microcontroller to monitor metrics including battery life and battery wear. Finally, a low power notification is outputted with the handheld device, if the current power level is less than or equal to the low power threshold. In this way, the user is made aware of the power level of the handheld device and may respond to the alert by recharging or replacing the portable power source.

In many cases, it is cumbersome to carry the handheld device in a user's hand or pocket. To improve convenience without compromising availability, the handheld device may be integrated into a wearable piece of clothing. The piece of wearable clothing may be a necklace, shirt collar, belt, sleeve, or a variety of other locations that enable the user to easily interface with the handheld device at will.

Although the invention has been explained in relation to its preferred embodiment, it is to be understood that many other possible modifications and variations can be made without departing from the spirit and scope of the invention as hereinafter claimed.

What is claimed is:

1. A method of requesting assistance from emergency services, the method comprises the steps of:
   (A) providing a handheld device, wherein the handheld device includes a microcontroller, a manual button, an inertial measurement unit (IMU) module, a global positioning system (GPS) module, and a wireless communication module;
   (B) providing a user account managed by at least one remote server, wherein the user account includes identification information and is associated with the handheld device;
   (C) providing a plurality of first-responder profiles stored by the remote server, wherein each first-responder profile includes contact information;
   (D) receiving an actuation notification from the manual button or an abnormal-movement notification from the IMU sensor with the microcontroller;
   (E) tracking a current location with the GPS module;
   (F) compiling the current location with either the actuation notification or the abnormal-movement notification into a service request with the microcontroller;
   (G) sending the service request to the remote server with the wireless communication module;
   (H) appending the identification information into the service request with the remote server;
   (I) comparing the service request to each first-responder profile with the remote server in order to identify at least one matching profile from the plurality of first-responder profiles;
   (J) sending the service request to the contact information of the matching profile with the remote server;
   providing a location history managed by the remote server, wherein the location history is associated to the user account;
   periodically sending the current location to the remote server with the wireless communication module; and
   appending the current location into the location history with the remote server.

2. The method of requesting assistance from emergency services, the method as claimed in claim 1 comprises the steps of:
   generating the abnormal-movement notification by detecting a dropping motion with the IMU during step (D), wherein the dropping motion indicates the handheld device falling from a higher elevation to a lower elevation and is remaining stationary at the lower elevation; and
identifying a first-responder profile for paramedics as the matching profile during step (I).

3. The method of requesting assistance from emergency services, the method as claimed in claim 1 comprises the steps of:
generating the abnormal-movement notification by detecting a jostling motion with the IMU during step (D), wherein the jostling motion indicates the handheld device being moved around in a forceful manner; and
identifying a first-responder profile for law enforcement as the matching profile during step (I).

4. The method of requesting assistance from emergency services, the method as claimed in claim 1 comprises the steps of:
providing at least one camera and a microphone with the handheld device;
capturing audiovisual data with the camera and the microphone after step (D); and
appending the audiovisual data into the service request with the microcontroller before step (G).

5. The method of requesting assistance from emergency services, the method as claimed in claim 4 comprises the steps of:
providing a facial recognition software managed by the remote server, wherein a plurality of criminal faces is stored on the remote server;
processing the audiovisual data through the facial recognition software in order to identify at least one arbitrary face from the audiovisual data after step (G);
comparing the arbitrary face to each criminal face with the remote server in order to identify at least one matching face from the plurality of criminal faces; and
appending the matching face into the service request with the remote server before step (J).

6. The method of requesting assistance from emergency services, the method as claimed in claim 4, wherein the at least one camera includes a normal camera and an infrared camera, and wherein the normal camera is configured for daytime use, and wherein the infrared camera is for nighttime use.

7. The method of requesting assistance from emergency services, the method as claimed in claim 1 comprises the steps of:
providing at least one mobile communication device, wherein the mobile communication device is communicably coupled to the handheld device; and
relaying the service request from the wireless communication module, through the mobile communication device, and to the remote server during step (G).

8. The method of requesting assistance from emergency services, the method as claimed in claim 1 comprises the steps of:
providing each first-responder profile with a geofenced response area;
comparing the current location to the geofenced response area of each first-responder profile with the remote server during step (I) in order to identify a plurality of local profiles from the plurality of first-responder profiles; and
contextually designating the matching profile from the plurality of local profiles with the remote server.

9. The method of requesting assistance from emergency services, the method as claimed in claim 1 comprises the steps of:
providing the handheld device with a serial identification number; and
appending the serial identification number into the service request with the handheld device before step (G).

10. The method of requesting assistance from emergency services, the method as claimed in claim 1 comprises the steps of:
providing the handheld device with a portable power source, wherein a low power threshold is stored on the handheld device;
tracking a current power level of the portable power source with the microcontroller; and
outputting a low power notification with the handheld device, if the current power level is less than or equal to the low power threshold.

11. The method of requesting assistance from emergency services, the method as claimed in claim 1, wherein the handheld device is integrated into a wearable piece of clothing.

* * * * *